May 18, 1965
G. H. DUNLAP
3,184,031
LEHR LOADER
Filed March 28, 1963
7 Sheets-Sheet 1
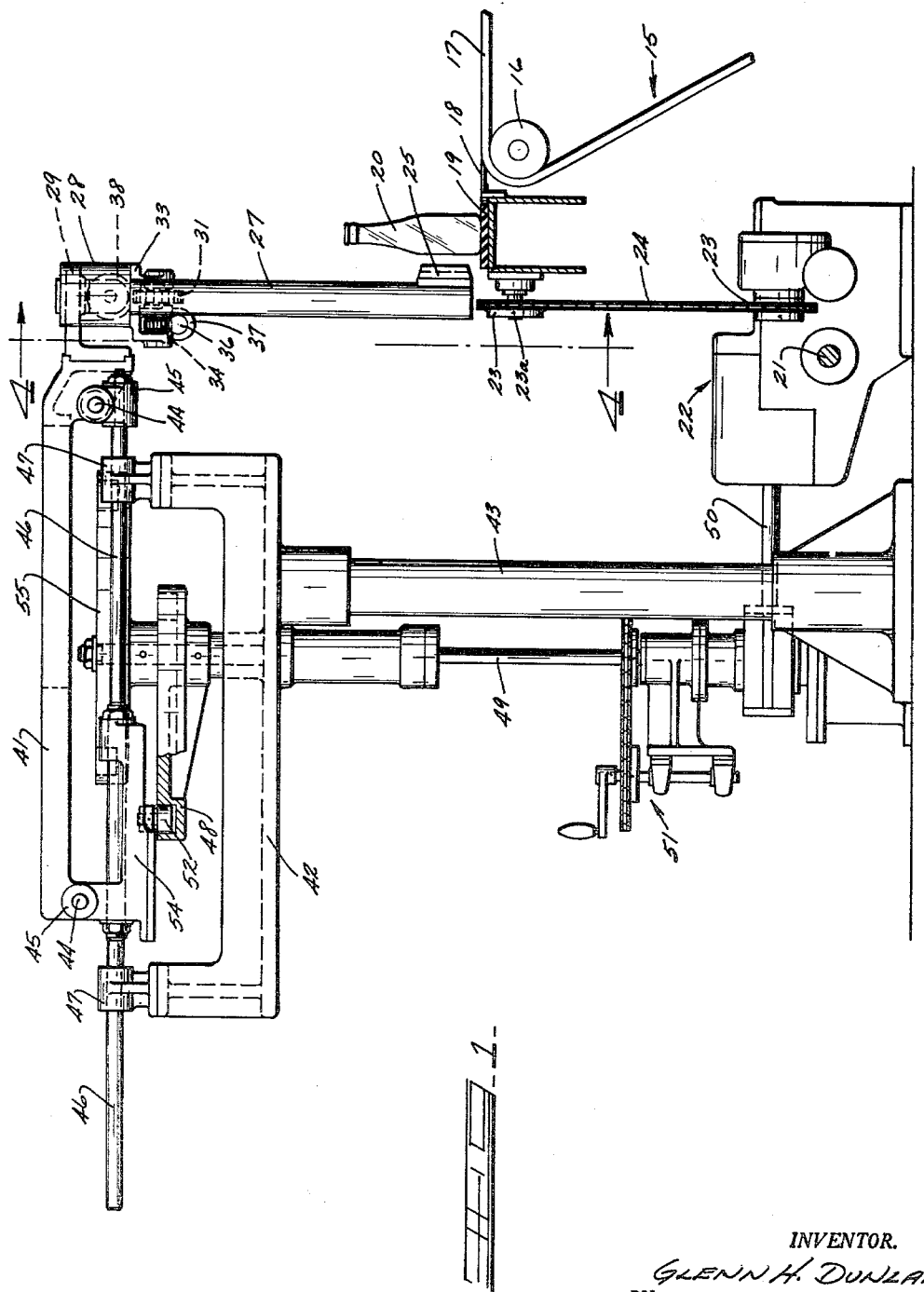
INVENTOR.
GLENN H. DUNLAP
BY J. R. Nelson
and W. A. Schaich
ATTORNEYS

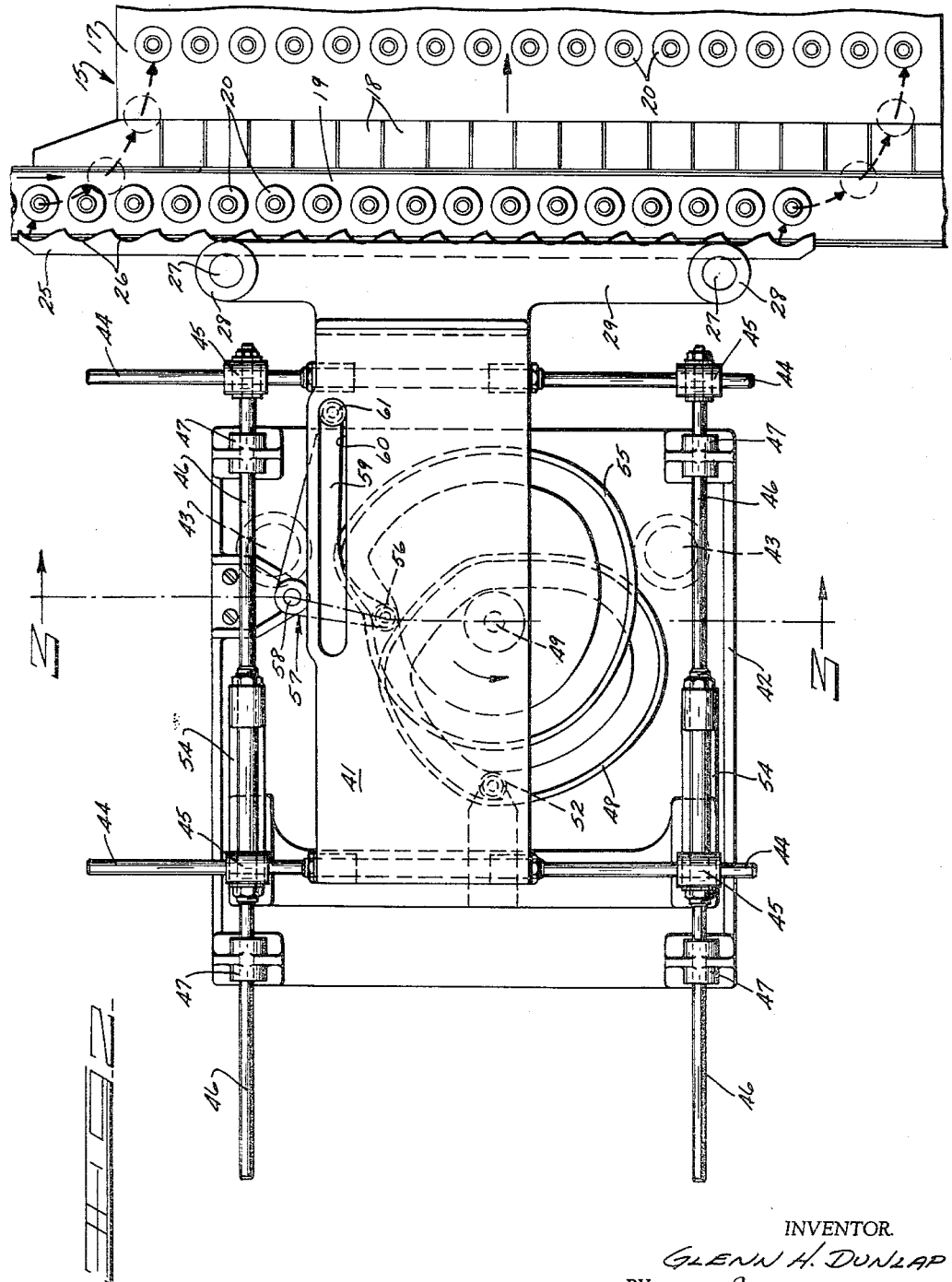

May 18, 1965    G. H. DUNLAP    3,184,031
LEHR LOADER
Filed March 28, 1963    7 Sheets-Sheet 3
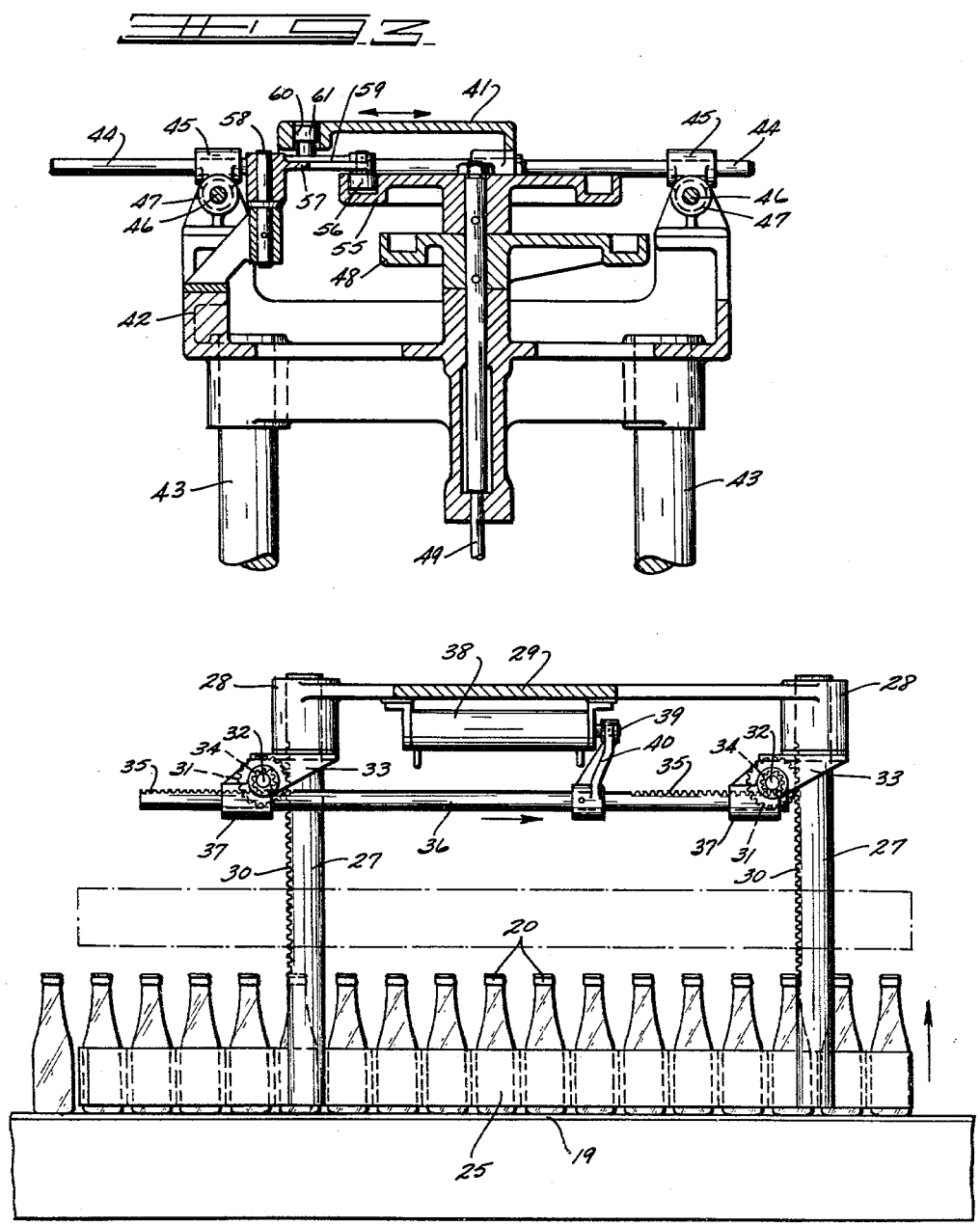
INVENTOR.
GLENN H. DUNLAP
BY
J. R. Nelson
and W. A. Schaich
ATTORNEYS

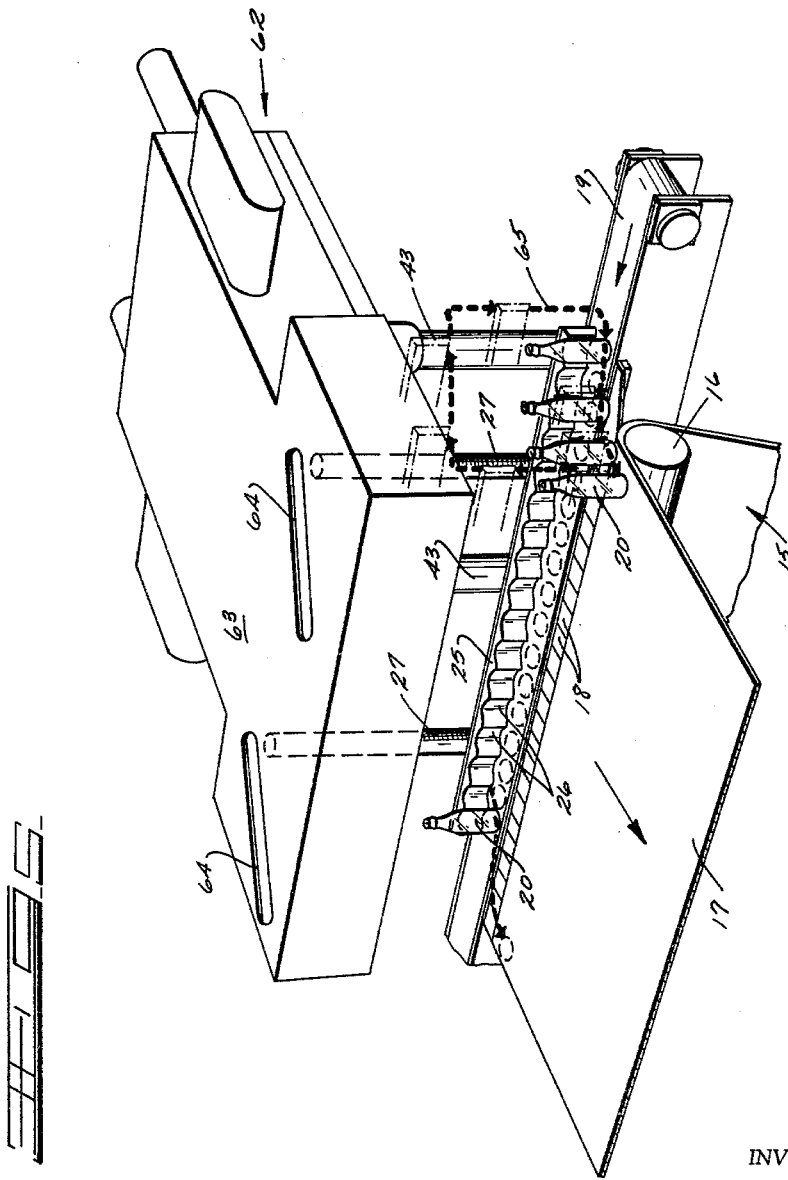

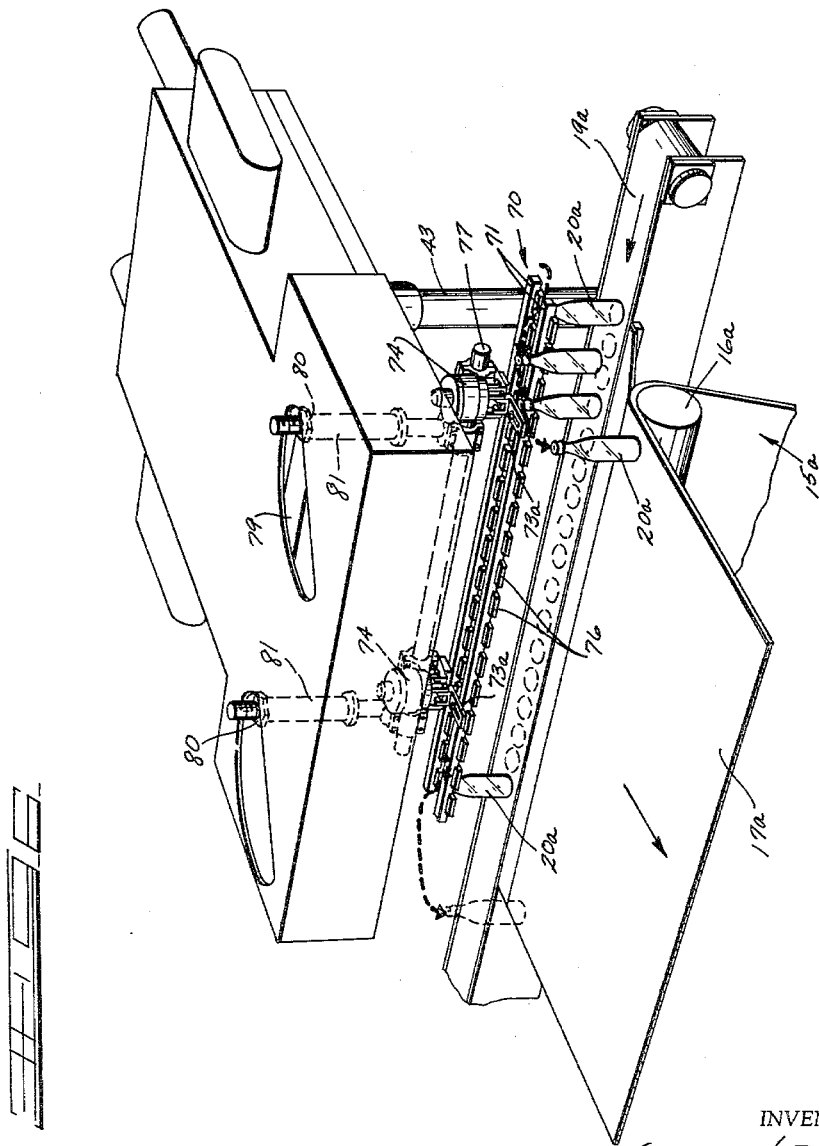

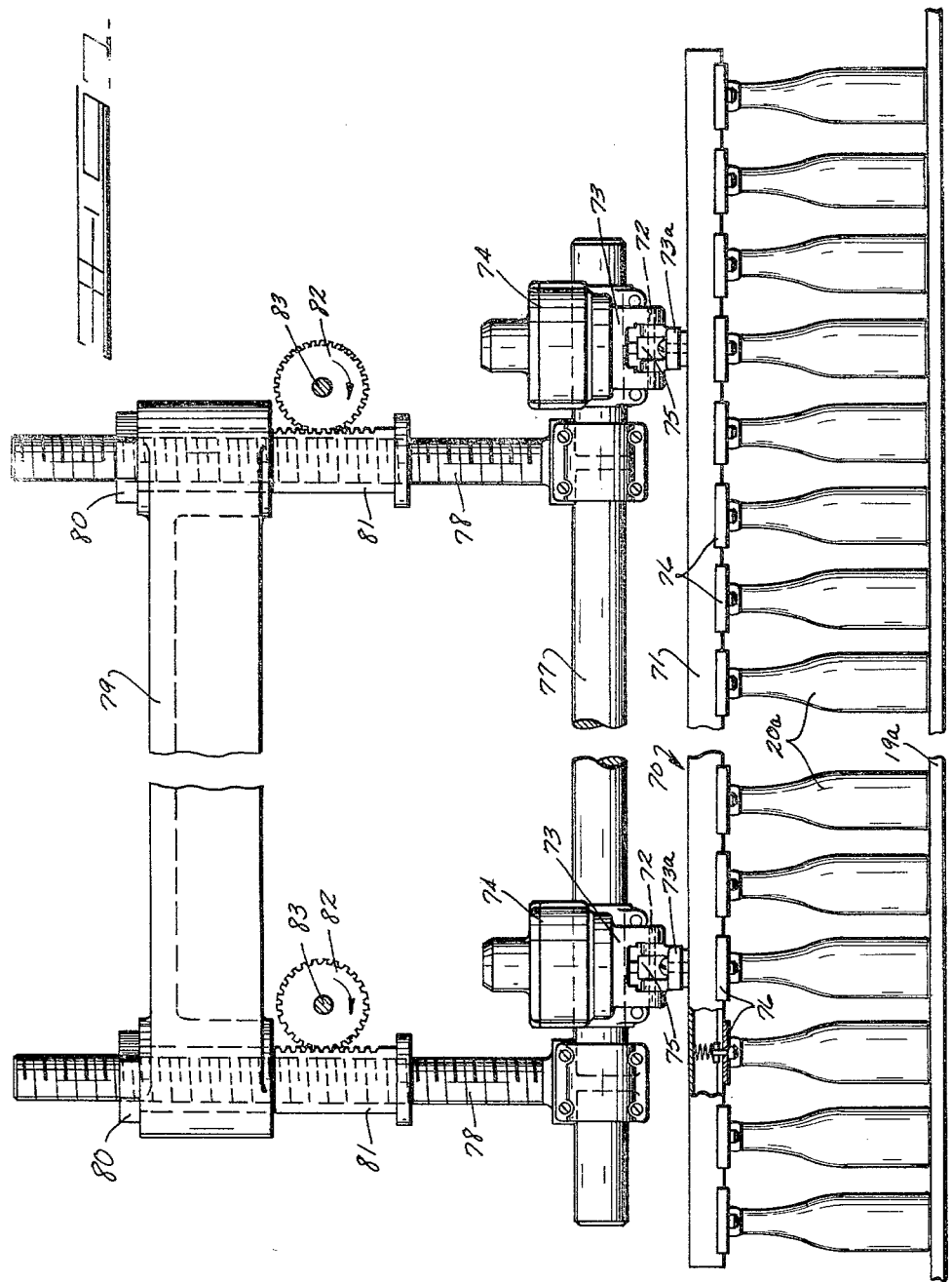

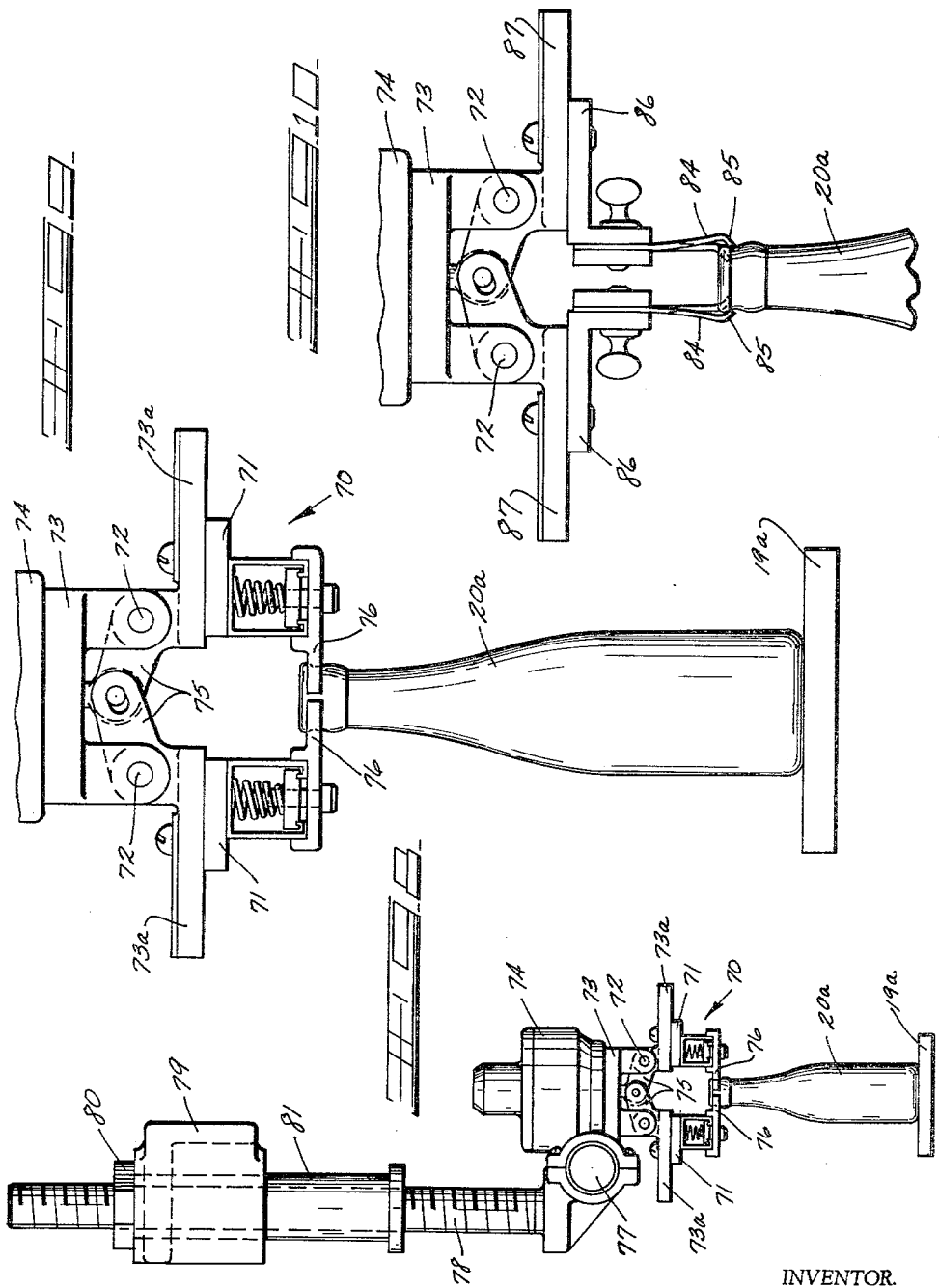

United States Patent Office 3,184,031
Patented May 18, 1965

3,184,031
LEHR LOADER
Glenn H. Dunlap, Lancaster, Ohio, assignor to Owens-Illinois Glass Company, a corporation of Ohio
Filed Mar. 28, 1963, Ser. No. 268,792
9 Claims. (Cl. 198—24)

My invention relates to lehr loaders and has for an object the provision of novel means for transferring articles, such as bottles and jars from a cross-conveyor to a lehr conveyor belt or mat.

In the conventional glassware annealing lehr and loader assembly, bottles, in upright position are delivered to a cross-conveyor at the receiving end of the lehr, such bottles being equidistantly spaced along the conveyor preparatory to being transferred in groups to the annealing lehr conveyor. A pusher-bar, or sweep, operating in synchronism with advance of the cross-conveyor, pushes the bottles laterally of the cross-conveyor and over a dead-plate onto the lehr mat. Thereupon the pusher bar is elevated, retracted, lowered and then held stationary a predetermined interval of time during which, in a normal operation, another group of bottles is formed on the cross-conveyor. At that moment, the pusher-bar repeats its group transfer step. Since these bottles or jars are moving continuously to and with the cross-conveyor without any interruption and desirably are uniformly spaced apart, it is evident that the pusher-bar actuation must be closely controlled to insure against upsetting a bottle or bottles immediately adjacent or following a group about to be pushed off of the cross-conveyor. It is evident, of course, that if the pusher bar strikes even one bottle improperly, the net result may and generally is the upsetting of several others, with not only loss of glassware by breakage, but also the need for an operator to spend time removing such broken glassware so as not to interfere more than necessary with normal production speed.

An important object of my invention therefore is the provision of novel, effective means for positively insuring against improper "cut-off" of each group of articles on the cross-conveyor from succeeding articles, to the end that all articles remain upright and flow in smooth fashion along the prescribed path, as intended.

A further object of my invention is the provision of pusher-bar actuating mechanism which imparts to the pusher-bar a vector velocity such that while it advances to transfer a group of bottles to the lehr conveyor, the bar also shifts longitudinally at the same lineal speed as the cross-conveyor, with the result that succeeding bottles cannot be struck by the pusher-bar and consequently a perfectly smooth operation is experienced.

Another object of my invention is the provision of a notched or recessed pusher-bar which will maintain the articles in spaced apart relationship during the transfer operation and very precisely position them in rows upon the lehr conveyor for subsequent fire-polishing by a row of overhead gas burners, just prior to actually entering the annealing lehr tunnel.

It is also an object of my invention to provide a novel improved mechanism for actuating the pusher-bar.

Finally it is an object of my invention to provide a novel arrangement of tongs or grippers for bodily lifting and transferring rows of bottles or jars from a cross-conveyor to an annealing lehr.

Other objects will be in part apparent and in part pointed out hereinafter.

In the accompanying drawings forming a part of my application:

FIG. 1 is a side elevational view with parts in section showing my lehr loader at the receiving end of a glassware annealing lehr.

FIG. 2 is a top plan view of the mechanism shown in FIG. 1.

FIG. 3 is a fragmentary sectional view taken along the plane of line 3—3 of FIG. 2 showing the cam mechanism for actuating the pusher-bar.

FIG. 4 is a sectional elevational view taken substantially along the plane of line 4—4 of FIG. 1.

FIG. 5 is a perspective view of the front or article engaging side of the pusher-bar, its supporting rods and cross-conveyor, with dotted lines indicating substantially the path of movement of the bar in each operating cycle.

FIG. 6 is a view similar to FIG. 5, but showing a bottle gripper-type bar used in lieu of the pusher-bar to bodily lift a group of bottles from the cross-conveyor and deposit same upright in a row upon the lehr conveyor.

FIG. 7 is a sectional elevational view of a tongs-type of bottle transfer mechanism.

FIG. 8 is an end elevational view of the mechanism shown in FIG. 7.

FIG. 9 is an enlarged end elevational view of the tongs and linkage shown in FIG. 8.

FIG. 10 is an elevational view showing leaf spring-life fingers in lieu of the tongs shown in FIGS. 8 and 9.

In the preferred form of my invention (FIGS. 1 through 5) it is shown positioned at the receiving end of a conventional glassware annealing lehr conveyor belt 15, or mat, which moves continuously over an idler pulley 16, with a horizontal article supporting reach 17 extending into a lehr tunnel (not shown). A dead-plate 18 lies between the lehr conveyor 15 and a cross-conveyor 19, which, as will become evident, brings bottles 20 or such articles to positions from which they may be transferred to the lehr conveyor 15. This cross-conveyor 19, in conventional fashion, receives bottles, or jars 20, in succession and at regular intervals from a forming machine (not shown) and conveying means including, for example, a conventional star-wheel (not shown), the latter functioning to space the bottles apart and insure like spacing of the bottles upon the cross-conveyor 19. This cross-conveyor 19 is driven by a motor (not shown) through a shaft 21 connected to a standard gear reduction unit 22. Sprockets 23 and a sprocket chain 24 operatively connect the unit 22 and a shaft 23a which supports the cross-conveyor.

The article transfer mechanism comprises a horizontal pusher-bar 25 provided on its working or article engaging face with a longitudinal series of vertical recesses 26, each intended to accommodate the body of a bottle 20 during actual transfer to the lehr conveyor 15. These recesses 26, as will be apparent, serve to positively confine the bottles to a prescribed path of travel during transfer and additionally hold the bottles spaced apart uniformly both during and immediately following completion of the transfer operation. This pusher-bar 25, moves horizontally toward the lehr conveyor 15 and concurrently therewith in the direction of travel of and at the same lineal speed as the cross-conveyor 19 to transfer bottles to the lehr conveyor. Upon completion of such movement, the pusher-bar 25 then is elevated and retracted to a position in back of the next row of bottles forming on the cross-conveyor and thereupon is lowered to the position from which it began the just completed transfer cycle.

The mechanism for supporting and moving the pusher-bar 25 in the manner described may be substantially as follows. A pair of spaced apart vertical rods 27 are connected at their lower ends to the pusher-bar 25 near its opposite ends, such rods, extending upwardly through guides 28 in the fixed horizontal bar 29 or cross-head. Each rod is formed along one side with rack-bar teeth 30 running in mesh with a pinion 31 which is mounted upon a horizontal shaft 32. Each shaft 32 is mounted in a bracket 33 and carries a gear 34 which meshes with teeth 35 on a rod-like rack-bar 36. This rack-bar is of a length to extend through the two guides 37, interconnecting the two sets of gears and pinion and is reciprocated at intervals to raise and lower the pusher-bar. A horizontal piston air-motor 38 suspended from the bar 29 has its piston rod 39 connected by an arm 40 to the rack-bar 36. Thus with operation of the motor 38 in synchronism with other related operations, as will become apparent as this description proceeds, the rack and pinion devices move the pusher-bar vertically upward or downward, as required.

Both the advancing and longitudinal motions of the pusher-bar 25 are cam controlled and timed with vertical movement of said bar and the flow of articles across the receiving end of the lehr upon the cross-conveyor 19. To this end the horizontal support bar 29 for the pusher-bar 25 is attached to the forward end of a horizontal slide 41 carried by a frame 42 at the upper end of a pair of vertical supporting posts 43. This slide 41, at opposite ends is mounted upon a pair of parallel horizontal guide rods 44 which are slidingly supported in four guides 45 which are carried by a pair of horizontal parallel guide rods 46 positioned in a plane below and extending at right angles to the upper pair of rods 44. The lower pair of guide rods 46 are mounted in four horizontal guides 47 provided on the main frame so that the slide 41 and both pairs of guide rods 44 and 46 may move toward and away from the cross-conveyor 19, as will be apparent. As indicated heretofore the pusher-bar 25 motion is so controlled as to provide a vector velocity to match the lineal speed of the cross-conveyor, to the end that while the pusher-bar advances to push bottles onto the lehr conveyor, it also moves with and at the same speed as the cross-conveyor and produces a smooth transfer operation.

Recriprocation of the slide 41 toward and away from the cross-conveyor 19 is obtained by cam mechanism comprising a box-cam 48 which is connected to the upper end of a driven shaft 49, the latter being driven from the aforementioned gear reduction unit 22 operating through a horizontal shaft 50 and conventional adjustable timer or synchronizer unit 51, the function of which will become more evident presently. The box cam 48 is operatively connected to the slide 41 through a cam roll 52 which is carried by a cross-bar 53 extending across the frame 42 and provided with arms 54 attached to the guide rods 46. Thus, with rotation of the cam 48, the slide moves toward and away from the bottle transfer position.

Movement of the slide in the general direction of travel of the cross-conveyor is obtained by means of a box cam 55, also mounted upon said driven shaft 49, but above the other cam 48. This upper cam 55 is operatively connected to the slide 41 through a cam roll 56 carried by a bell-crank lever 57 which is mounted for oscillation about a vertical pivot pin 58 on the main frame 42. One arm 59 of this lever 57 extends longitudinally beneath the slide which is formed with a slot 60 to accommodate a roller 61 mounted upon the upper side of said arm 59. Thus with rotation of the upper cam 55, the slide 41, and therefore the pusher-bar 25, may move generally in the direction of travel of the cross-conveyor 19.

Assume that the lehr conveyor 17 and cross-conveyor 19 are moving in normal fashion and bottles 20 are being placed upon the receiving end of the latter conveyor at regular intervals so that they are evenly spaced apart along the cross-conveyor. The lineal speed of the cross-conveyor 19 in relation to the speed of the lehr conveyor or mat is such that each time the latter has advanced a sufficient distance to present a clear area adequate to accommodate a transverse row of bottles adjacent the deadplate 18, the cross-conveyor 19 presumably will have placed a complete row of bottles in front of the lehr ready for transfer to the latter. Consequently, and assuming bottles have been properly positioned upon the cross-conveyor, the number of bottles will be sufficient to form a row across the lehr conveyor. At the moment the cross-conveyor has about moved the above indicated distance, the cams 48 and 55 move the previously lowered pusher-bar 25 both toward and into contact with bottles on said cross-conveyor and in the general direction of travel of the cross-conveyor 19, at the same speed the latter is advancing. Bottles engaged by the pusher-bar immediately enter the recesses 26 thereof and as a consequence they advance in controlled spaced-apart relationship along precise generally diagonal paths to the lehr conveyor. Here they are placed in a row with the bottles spaced apart uniformly, this being especially advantageous where the neck and shoulder areas are being subjected to "fire-polishing" by overhead burners (not shown) just prior to entering the lehr proper. Should the timing of the pusher-bar advance be improper in relation to the cross-conveyor travel and arrival of bottles at the transfer or loading position, so that they do not register properly with the recesses 26 in the pusher-bar 25, such may be corrected by manipulation of the timer or synchronizing unit 51. This timer may well operate in the manner of the mechanism utilized in Seibert's U.S. Patent No. 2,921,664 for advancing or retarding the shaft 48, as best shown in FIGS. 6, 6A and 6B of that patent. Thus the time of initial contact between the pusher-bar and row of articles on the cross-conveyor is advanced or retarded, as may be required. In FIG. 5 I have shown a housing 62 enclosing the pusher-bar actuating mechanism with the cover 63 provided with a pair of diagonal vertical slots 64 through which the bar supporting posts 27 project at times during each cycle of operations. The heavy dash line 65 indicates approximately the path of travel of the pusher-bar as it moves through each cycle. Because the pusher-bar advances substantially along a diagonal path, as explained, there can be no interference between it and incoming bottles contiguous to the row about to be transferred.

In FIGS. 6–9, I have shown a somewhat modified form of loader wherein the pusher-bar 25 is replaced by grippers 70 or tongs which bodily lift and transfer bottles 20a in groups from the cross-conveyor 19a to the ware supporting reach 17a of the lehr conveyor or mat. Thus the bottles do not slide over the conveyor and dead-plate surfaces and additionally are precisely "spot" positioned upon the lehr conveyor. The grippers 70 are suspended from a holder comprising a pair of parallel spaced-apart horizontal support bars 71, (FIGS. 7 and 9) such being pivoted by hinge pins 72 to a pair of air motor carrying brackets 73, through arms 73a. Thus the support bars 71 may be rocked about the hinge pins 72 by means of air motors 74 operating through links 75 to alternately open and close the grippers 70. Each such gripper 70 comprises a pair of jaws 76 suspended from the bars 71. The air motors 74 are actuated by any suitable means (not shown) to operate the grippers at regular time intervals.

These air motors 74 are mounted upon a carrier 77 which may be a horizontal rod clamped to the lower end of a pair of vertical rods 78; these latter extending upwardly through a cross-head 79. This cross-head is functionally similar to the bar 29 in FIG. 4 and is moved by cams (not shown) similar to the previously described cams 48 and 55. These rods 78 are adjustable axially by means of nuts 80 to raise or lower the grippers as required by the particular bottle height. Tubular rack bars 81 are telescoped over portions of the vertical rods 78 and mesh with pinions 82 which are mounted upon horizontal shafts 83. These pinions are parts of mechanism (not shown) identical to that shown in FIG. 4 for raising and lowering the pusher-bar supporting rods 27. Here, however, the cycle of actuating the pinions and therefore moving the grippers up and down differs to the extent required to raise and lower the grippers in timed relation to opening, closing and advancing and retracting same. Such timing is obtained through the use of a conventional timer or synchronizer unit (not shown) obtainable in the open market.

In FIG. 10 I have shown a further modification which is identical to that in FIGS. 7–9, with the single exception that the jaws 84 are lengths of spring steel formed with fingers 85 for holding engagement with articles to be transferred. These jaws 84 are suspended from bars 86 which in turn are attached to arms 87 mounted and operated as in the just-described modification.

Further modifications may be resorted to within the spirit and scope of the appended claims.

I claim:

1. In combination, a lehr conveyor, a cross-conveyor extending horizontally across an end of the lehr conveyor, a dead plate lying between said conveyors, means moving the cross-conveyor to present rows of upstanding articles thereon for group transfer to the lehr conveyor, article transfer means including an article engaging device, and means for reciprocating the device along a path extending diagonally only across both the cross-conveyor path and dead plate thereby to correspondingly move each article during its transfer to the lehr conveyor and means for imparting vertical movement to said device in timed relation to its movement along said path.

2. The combination defined in claim 1, the reciprocating means comprising a pair of superposed co-axial rotary cams and a plurality of guide rods and a slide actuated by said cams.

3. In combination a horizontal continuously advancing lehr conveyor, a continuously moving cross-conveyor at one end of the lehr conveyor to present successive rows of articles at said end of the lehr conveyor, a dead plate lying between said conveyors, a horizontal pusher-bar, means for raising and lowering the pusher-bar, between levels at a side of and above the articles, and means for advancing the pusher-bar along a path extending diagonally only across the cross-conveyor path and dead plate thereby moving the articles along that path to positions upon the lehr conveyor, the last-named means comprising a cam device for moving the pusher-bar at a right angle to the path of the cross-conveyor and a cam device synchronized with the other cam device for moving the pusher-bar in the direction of travel of and at the same lineal speed as said cross-conveyor.

4. The combination defined in claim 3, the last-named means comprising a support for the pusher-bar, a horizontal slide carrying said support, guides supporting the slide whereby the slide is free to move along a path toward and away from the lehr conveyor, means in a plane below the slide supporting it and said guides whereby the slide is free to move at right angles to the last-named path and cam means causing the slide to move along both paths concurrently and thereby direct the pusher-bar along a path extending diagonally of the path of the cross-conveyor.

5. The combination defined in claim 3, the pusher-bar raising and lowering means comprising rack-bars extending upwardly from the pusher-bar, a horizontal cross-head through which the rack-bars are freely movable, pinions meshing with the rack-bars and piston motor actuated means for oscillating the pinions in synchronism with the other movement of the pusher-bar.

6. The combination defined in claim 4, the cam means including superposed coaxial rotating cams mounted upon a vertical shaft and common means driving the shaft and cross-conveyor.

7. The combination defined in claim 6 and a synchronizing unit interposed between the driving means and shaft for advancing or retarding the cam means operation relative to the cross-conveyor movement.

8. The combination defined in claim 4, there being a main frame supporting the slide and guide rods and a bell-crank lever pivoted to the frame, said lever having a cam roll at one end and a roller at its other end, said slide having a vertical slot receiving said roller and a rotary cam guiding the cam roll thereby to rock the lever.

9. A lehr loader comprising an elongated horizontal pusher-bar, means for moving the bar vertically and mechanism comprising a pair of superposed rotary cams mounted on a common vertical axis and a slide subjected to multi-directional horizontal movement by said cams for moving the pusher bar along a path extending only diagonally of the length of said bar.

References Cited by the Examiner
UNITED STATES PATENTS

| | | | |
|---|---|---|---|
| 1,431,895 | 10/22 | Purcell | 198—24 X |
| 1,567,725 | 12/25 | Freese | 214—1-B.2 X |
| 1,620,778 | 3/27 | Odom | 214—1B2 X |
| 1,726,657 | 9/29 | Ekvall | 198—24 |
| 1,795,665 | 3/31 | Miller | 214—1B2 |
| 1,842,912 | 1/32 | McNamara | 198—24 |
| 3,040,867 | 6/62 | Posten et al. | 198—24 X |

SAMUEL F. COLEMAN, *Primary Examiner.*

WILLIAM B. LA BORDE, *Examiner.*